(No Model.)
F. B. BEVER.
DRIVING REIN SPUR.
No. 319,179. Patented June 2, 1885.
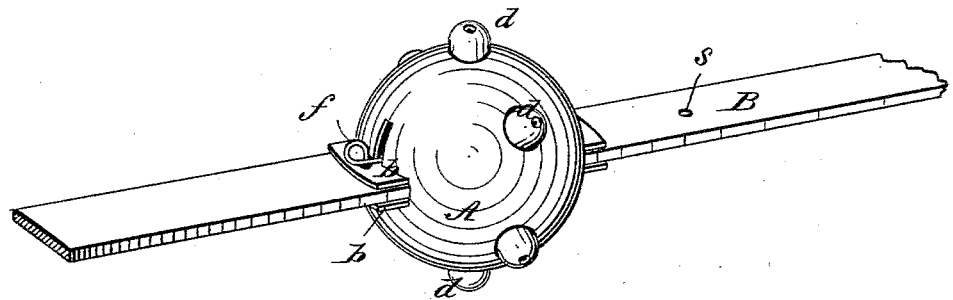
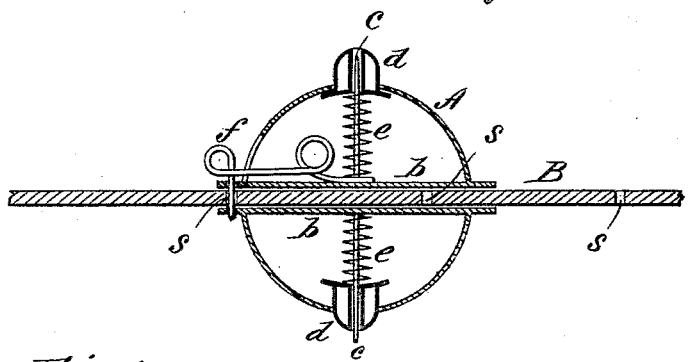
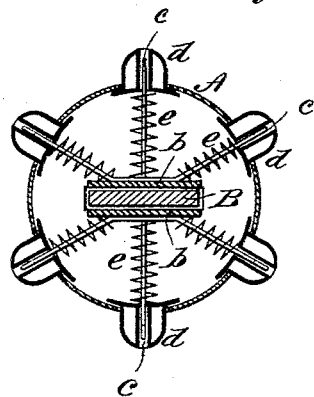
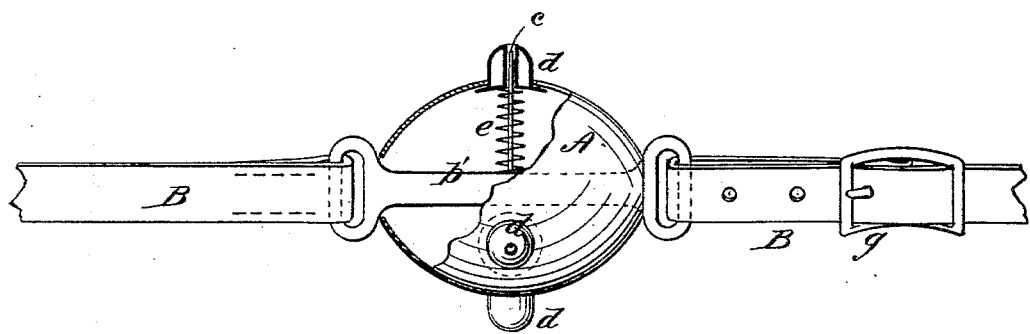
WITNESSES:
Donn Twitchell
C. Sedgwick
INVENTOR:
F. B. Bever
BY Munn & Co
ATTORNEYS.

UNITED STATES PATENT OFFICE.

FIELDING B. BEVER, OF OTTAWA, KANSAS.

DRIVING-REIN SPUR.

SPECIFICATION forming part of Letters Patent No. 319,179, dated June 2, 1885.

Application filed April 7, 1885. (No model.)

*To all whom it may concern:*

Be it known that I, FIELDING BURNES BEVER, of Ottawa, in the county of Franklin and State of Kansas, have invented a new and Improved Rein-Line Spur, of which the following is a full, clear, and exact description.

This invention has for its object the substitution for the whip of a spur in driving one or more horses, either when attached to a vehicle or hitched to a plow, &c.; and it consists in a spur, attached to the rein-line, of peculiar construction, substantially as herein shown and described, and whereby on slapping the horse with the rein-line the attached spur is projected into or against the flank or rear portion of the animal.

The invention will be found of great advantage in driving a span of horses to urge the one horse to keep pace with its mate, especially when one horse of the pair will not bear the whip while the other will. It will also be a great advantage over the whip when plowing and the team walks slowly, inasmuch as the line is always in hand, and it is customary and natural for the driver to slap the horse with the line, and when a horse scares and there is not time to reach the whip, the line having the spur attached may be used to slap the horse with, which will be found equal to all or most emergencies.

Reference is to be had to the accompanying drawings, forming part of this specification, in which similar letters of reference indicate corresponding parts in all the figures.

Figure 1 represents a view in perspective of a rein-line in part having the spur attachment applied; Figs. 2 and 3, sections of the same, taken longitudinally and transversely of the rein-line. Fig. 4 is a partially broken or sectional longitudinal view of a modified construction of the invention.

Referring in the first instance, or more particularly to Figs. 1, 2, and 3 of the drawings, A indicates a hollow ball or case of any suitable form and size constructed or provided with parallel intersecting plates $b\ b$, through or between which the rein-line B is passed to admit of the proper placing or sliding of the case on the line to adapt the spur to horses of different sizes. Said case forms what may be termed the "outer" shell-frame or pricker carrier or holder of the spur, and may either be of close or open work construction, as desired; but it is preferred to make it a close one and of spherical or prolate spheroidal shape.

Secured to the plates $b\ b$ are any number of needles or prickers, $c\ c$, arranged to project through and beyond the case at different points in its surface or around it. Perforated inwardly and outwardly sliding protecting-caps $d\ d$ are arranged to inclose the protruding end portions of the needles or prickers $c\ c$. These caps rest at their inner ends upon springs $e\ e$, arranged around the needles or otherwise, as desired, in order that the caps may be kept pressed outward, except when slapping the horse with the rein-line, when one or more of the caps of the whole device or spur coming in contact with the animal, it or they will be forced in against the pressure of the springs $e$, and so expose the needle or needles and cause them to prick the horse.

The whole spur or device is or may be held to its required place on the rein-line by means of a spring-catch, $f$, secured within the case, and arranged to pass out therethrough and to engage with apertures in protruding ends of the plates $b\ b$ and with any one of a series of apertures, $s$, in the rein-line.

The catch is here shown as made of spring-wire, and as secured about or around one of the prickers; but it may be of any suitable construction and be variously attached.

The yielding caps $d$ prevent the needles or prickers from pricking the horse when not desired. The spur may be fitted with any number of prickers $c$.

Instead of attaching the spur to the rein-line, as above described, the line B may be transversely divided or made in sections, so as not to pass through the spur or case thereof, but to connect outside of the same with a stem or looped center bar, $b'$, arranged to project through and beyond opposite sides or ends of the case, as shown in Fig. 4, in which case the prickers $c$ will be carried by said stem, and the one portion of the line may have a buckle-like slide, $g$, to adjust the spur to the length or size of the horse.

Having thus described my invention, I claim as new and desire to secure by Letters Patent—

1. A rein-line spur in which are combined a case-frame or pricker-holder, a series of projecting attached prickers, and yielding perforated spring protecting-caps arranged to inclose the outer protruding ends of the prickers, substantially as and for the purpose or purposes specified.

2. In a rein-line spur, the combination of the outer case or shell, A, the prickers c, the outwardly and inwardly sliding protecting-caps d, and the springs e, essentially as shown and described.

3. In a rein-line spur, the combination of a spring-catch for holding the spur at any desired point on the rein-line with the outer case or shell, A, the prickers c, and the yielding perforated protecting-caps d, substantially as specified.

4. The case A of the spur, provided with intersecting plates b b, in combination with the spring-catch f and the perforated rein-line B, essentially as described.

FIELDING B. BEVER.

Witnesses:
WM. KILER,
JOHN T. BEVER.